United States Patent [19]

Yoshida et al.

[11] 4,171,906
[45] Oct. 23, 1979

[54] DEVICE FOR HOLDING DOWN A DOCUMENT

[75] Inventors: Yutaka Yoshida, Higashi-Yamato; Kiyoshi Miyashita, Hachioji, both of Japan

[73] Assignee: Olympus Optical Company Ltd., Tokyo, Japan

[21] Appl. No.: 906,555

[22] Filed: May 16, 1978

[30] Foreign Application Priority Data

May 18, 1977 [JP] Japan ............................. 52-62496[U]

[51] Int. Cl.² .......................................... G03B 27/62
[52] U.S. Cl. ................................................... 355/75
[58] Field of Search ........................... 355/75, 76, 3 R

[56] References Cited

U.S. PATENT DOCUMENTS

| 2,638,827 | 5/1953 | Leavitt et al. | 355/75 X |
| 2,774,289 | 12/1956 | Collins | 355/75 X |
| 3,410,190 | 11/1968 | Browning | 355/75 |
| 3,685,905 | 8/1972 | Marshall et al. | 355/75 |
| 3,994,582 | 11/1976 | Goshima et al. | 355/75 |
| 4,072,418 | 2/1978 | Fujizuka | 355/75 |
| 4,097,145 | 6/1978 | Luperti et al. | 355/75 |

Primary Examiner—Richard A. Wintercorn
Attorney, Agent, or Firm—Haseltine, Lake & Waters

[57] ABSTRACT

A device for pressing down a document to be duplicated on a document table of an electrophotographic apparatus comprises a flexible cover which is journaled along its one edge portion and a supporting frame which supports the document cover in an opened or upright position. Near the free end of the document cover there is secured a handle or grip which engages with the supporting frame. In case of duplicating a thick document such as a book the handle can be disengaged from the frame and the thick document can be effectively pressed down on the table by means of the document cover. The document cover and the frame are detachably arranged at positions which are lower than the surface level of the document table. Documents larger than the document table can be easily duplicated by removing the document cover and the supporting frame.

5 Claims, 3 Drawing Figures

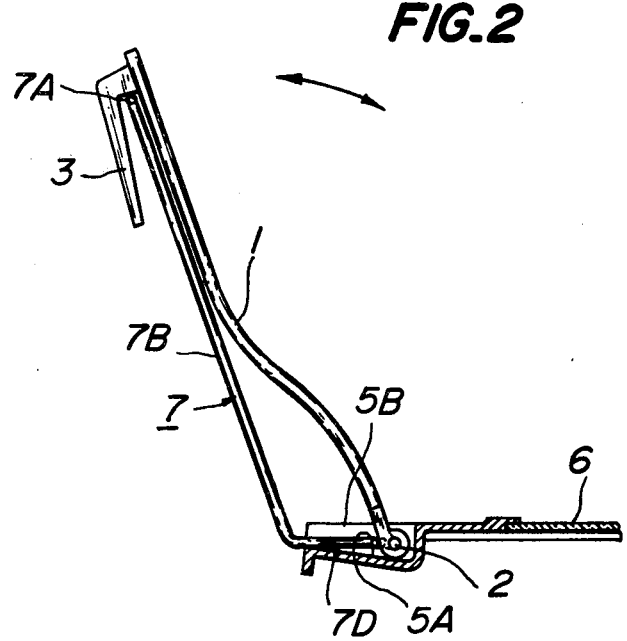
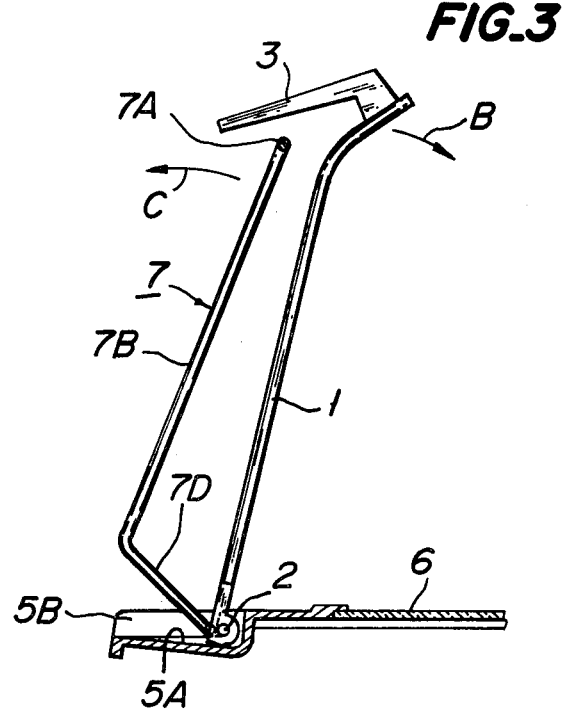

DEVICE FOR HOLDING DOWN A DOCUMENT

BACKGROUND OF THE INVENTION

The present invention relates to a device for holding or keeping down a document or original material onto a document table of a duplicating apparatus and the like.

In duplicating apparatuses such as an electrophotographic apparatus there has been widely used a device for holding down a document on a document table and comprising a flexible document cover having an edge portion rotatably fitted to a body of the duplicating apparatus. Such a document holding device may be or may not be provided with a frame which supports the document cover in an opened or upright position. When the document is to be set on the document table of the duplicating apparatus having the document holding device without the supporting frame an operator must hold the document cover in the substantially opened position with his single hand or must fully rotate the document cover. At any rate the operation for setting the document on the document table is quite cumbersome. Whereas in the document holding device with the supporting frame which is not interconnected to the document cover the operator has to return the cover and the supporting frame into a closed position by means of two successive operations. That is to say at first the operator must return the cover into the closed position and then return the frame into the closed position. It is known to couple the supporting frame with the cover by means of a handle or grip secured to the front surface of the cover near its free edge portion. By this construction the cover and the frame can be moved simultaneously and they can be returned into the closed position by means of a single operation. However such a holding device is not suitable for pressing down a thick document material such as a book onto the document table. In general the document cover and supporting frame are journaled at a level lower than the upper surface of the document table. Thus when a part of a document larger than the document table is to be duplicated, it is sometimes required to fold the large document.

SUMMARY OF THE INVENTION

The present invention has for its object to provide a novel and improved device which can effectively hold or keep thin and thick documents onto a document table by means of a simple operation.

It is a further object of the invention to provide a document holding device comprising a flexible document cover and a supporting frame which can be simply decomposed so that a document larger than the document table can be placed without being folded.

A device for holding down a document onto a document table according to the invention comprises a base member connected to said document table;

a flexible document cover having a surface area substantially equal to that of the document table and being rotatably hinged to said base member at its one edge portion about an axis parallel to the plane of the document table, the document cover having a first position in which the document cover is in parallel with the document table and completely covers the document table and a second position in which the document cover is in a substantially upright position and completely exposes the document table;

a handle member secured to a front surface of the document cover near the other edge portion which is remote from the hinged edge portion; and a supporting frame member rotatably hinged to the base member at one edge portion near the hinged edge portion of the document cover, the other edge portion of the supporting frame member being detachably engaged with the handle member and the supporting frame member being kept in a substantially upright position; whereby said document cover is kept in the second position by the engagement of the handle member with the supporting frame member in the substantially upright position and the document cover can be solely returned into its first position by disengaging the handle member from the supporting frame member.

BRIEF DESCRIPTION OF THE DRAWINGS

FIG. 2 is a side view of the device of FIG. 1 in which a document cover is kept in an open position; and FIG. 3 is a side view of the device of FIG. 1 in which the document cover is disengaged from a supporting frame.

DESCRIPTION OF THE PREFERRED EMBODIMENTS

Figure 1:
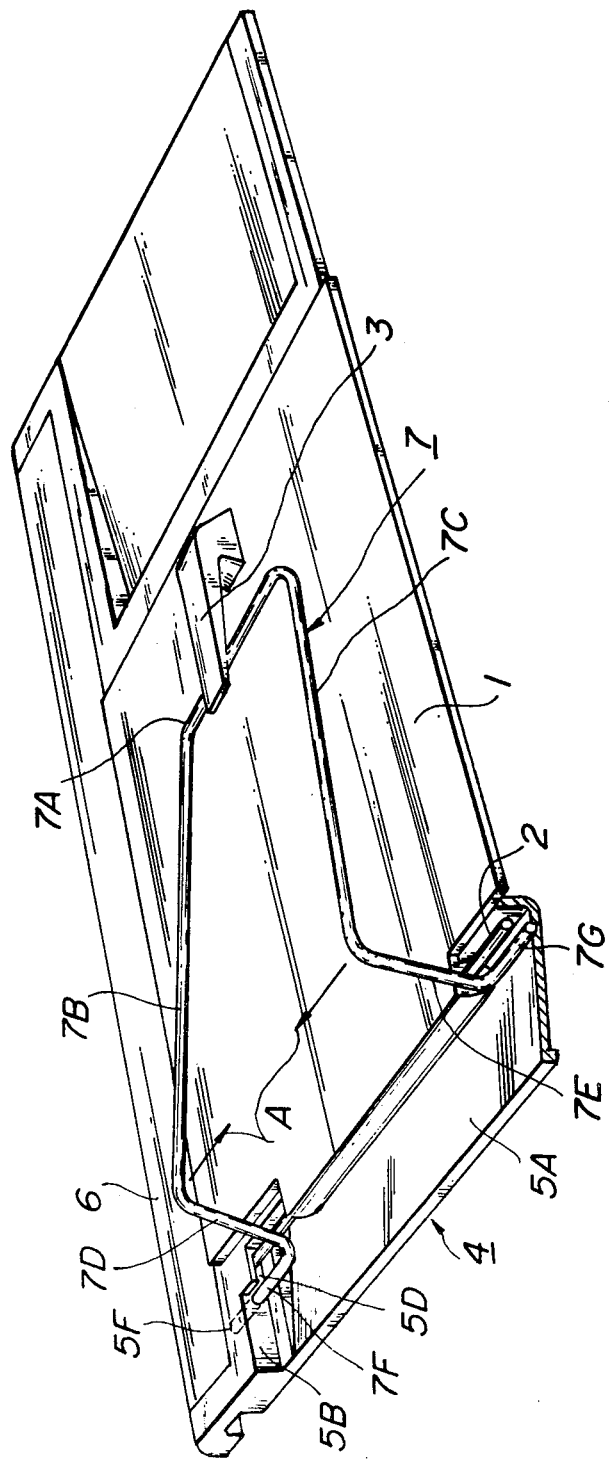
FIG. 1 is a perspective view showing an embodiment of a device for holding down a document according to the invention.

FIG. 1 is a perspective view showing an embodiment of the device for holding down documents according to the invention. The document holding down device of this embodiment may be applied to an electrophotographic apparatus. The device comprises a document cover 1 made of flexible material such as rubber, synthetic resin, and the like. Along one edge portion of the document cover 1 is secured a shaft 2. Near the opposite edge of the cover 1 a handle or grip 3 is secured to a front surface of the cover. The document holding device further comprises a base member 4 consisting of a molded body of synthetic resin and having a bottom plate 5A which extends substantially parallel to a plane of a document table 6 and a pair of side walls 5B and 5C (in FIG. 1 only one of the side walls 5A is shown) which extend perpendicularly to the document table 6. In the side walls 5B and 5C there are formed hook portions 5D and 5E, respectively (only hook portion 5D is illustrated in FIG. 1). As shown in FIG. 1 the both ends of the shaft 2 is detachably fitted in the hook portions 5D and 5E, respectively. Therefore the document cover 1 can be rotated about the shaft 2 with grasping the handle 3 with a single hand of an operator. There is further provided a supporting frame 7 which is formed by bending a single metal rod or pipe in a substantially U-shaped form as shown in FIG. 1. The supporting frame 7 comprises a top portion 7A which extends in parallel with the shaft 2 and is detachably engaged with the handle 3, a pair of side portions 7B and 7C which extends substantially perpendicular to the top portion 7A, a pair of leg portions 7D and 7E and a pair of end portions 7F and 7G which are detachably inserted into holes 5F and 5G (one of holes 5G is not shown) formed in the side portions 5B and 5C, respectively of the base member 4. Since the holes 5F and 5G are provided in front of the hook portions 5D and 5E, respectively, after the end portions 7F and 7G have been inserted the holes 5F and 5G, respectively the shaft 2 could not be removed from the hook portions.

As clearly shown in FIG. 2 the leg portions 7D and 7E of the frame 7 are bent substantially at right angles with respect to the end portions 7F and 7G. Thus when the supporting frame 7 is turned into an upright position, the leg portions 7D and 7E rest on the bottom plate 5A of the base member 4 and thus the frame is kept in the upright position even if the operator lets go his hold of the handle 3. Moreover the fitting points of the document cover 1 and supporting frame 7, i.e. the shaft 2 and the end portions 7F and 7G are situated below the plane of the document table 6.

When the document cover 1 is opened while grasping the grip 3, the supporting frame 7 is also rotated into the upright position illustrated in FIG. 2. This movement is restricted when the leg portions 7D and 7E of the frame 7 are made contact with the bottom plate 5A and in this upright position the document cover 1 is kept opened by an engagement of the handle 3 with the top portion 7A of the frame 7. In this manner the opened condition of the document cover 1 can be stably maintained by the supporting frame 7.

In case of duplicating a thick document such as a book the handle 3 is disengaged from the supporting frame 7 by bending the top portion of the document cover 1 as illustrated in FIG. 3 and then put down the document cover 1 on the book as shown by an arrow B. In this case the frame 7 may be rotated in an anti-clockwise direction as depicted by an arrow C so as to be kept in the upright position.

When the leg portions 7B and 7C of the frame 7 are resiliently deformed as shown by arrows A in FIG. 1 so as to remove the end portions 7F and 7G from the holes 5F and 5G, respectively, the frame can be detached from the body 4. Then the document cover 1 can be also pulled out of the hook portions 5D and 5E. By removing the document cover 1 and the frame 7 from the electrophotographic apparatus there is no projection beyond the upper surface of the document table 6 and thus it is possible to put a document larger than the document table 6 on the table. In this manner any part of the large document can be easily duplicated. This is very convenient for duplicating panel photographs, framed pictures, large photographs, etc.

As explained above according to the present invention the document cover 1 and the frame 7 for supporting the cover in the upright or opened position are detachably journaled at such points that are lower than the plane of the document table and thus when the document cover and the frame are removed, a part of the document larger than the table can be duplicated without folding the document. Moreover by disengaging the document cover from the supporting frame it is possible to press down effectively the thick documents such as books on the document table by means of the flexible document cover 1.

What is claimed is:

1. A device for holding down a document onto a document table comprising
a base member connected to said document table;
a flexible document cover having a surface area substantially equal to that of the document table and being rotatably hinged to said base member at its one edge portion about an axis parallel to the plane of the document table, the document cover having a first position in which the document cover is in parallel with the document table and completely covers the document table and a second position in which the document cover is in a substantially upright position and completely exposes the document table;
a handle member secured to a front surface of the document cover near the other edge portion which is remote from the hinged edge portion; and
a supporting frame member rotatably hinged to the base member at one edge portion near the hinged edge portion of the document cover, the other edge portion of the supporting frame member being detachably engaged with the handle member and the supporting frame member being kept in a substantially upright position; whereby said document cover is kept in the second position by the engagement of the handle member with the supporting frame member in the substantially upright position and the document cover can be solely returned into its first position by disengaging the handle member from the supporting frame member.

2. A device according to claim 1, wherein said document cover and supporting frame are detachably hinged to the base member at a level which is lower than the upper surface of the document table.

3. A device according to claim 2, wherein said supporting member is consisting of a resilient rod which is bent into a substantially U-shaped form having a top portion which extends in parallel with said axis and engages with the handle member, a pair of side portions which are connected to said top portion and extend substantially perpendicular to said axis, a pair of leg portions each of which is connected to a respective one of said side portions and a pair of end portions each of which is connected to respective one of said leg portions and is pivotably supported to said base member, and said leg portions are in contact with said base member so as to keep the frame member in said substantially upright position.

4. A device according to claim 3, wherein each of said end portions of the supporting frame member extends in parallel with said axis and is freely inserted in a hole formed in respective one of side walls of the base member and extending substantially at right angles to the document table and the supporting frame member is detached from the base member by moving said end portions against its resilient force in such directions that they come close together.

5. A device according to claim 4, wherein said document cover is provided with a shaft at its rotatably hinged edge portion and each of said side walls of the base portion has formed therein a recess which extends substantially parallel to the plane of the document table and has an opening near said hole, whereby said shaft is inserted into and removed from the recesses while the end portions of the supporting frame member being removed from the holes.

* * * * *